United States Patent [19]

Fassbender

[11] 4,232,584

[45] Nov. 11, 1980

[54] CONTROL ELEMENT FOR AUXILIARY POWER STEERINGS

[75] Inventor: Rolf Fassbender, Mutlangen, Fed. Rep. of Germany

[73] Assignee: Zahnradfabrik Friedrichshafen AG, Friedrichschafen, Fed. Rep. of Germany

[21] Appl. No.: 13,908

[22] Filed: Feb. 22, 1979

[30] Foreign Application Priority Data

Feb. 22, 1978 [DE] Fed. Rep. of Germany ....... 2807464

[51] Int. Cl.³ ............................................. F15B 11/08
[52] U.S. Cl. .................................. 91/418; 137/625.69
[58] Field of Search .................. 91/418, 419, 420, 436; 60/384; 180/54; 416/61 R; 137/625.69

[56] References Cited

U.S. PATENT DOCUMENTS

| | | | |
|---|---|---|---|
| 2,963,316 | 1/1961 | Schultz | 137/625.69 X |
| 3,119,235 | 1/1964 | Lewis | 137/625.69 X |
| 3,176,721 | 4/1965 | Gordon | 137/625.69 X |
| 3,273,468 | 9/1966 | Allen | 91/436 X |
| 3,312,246 | 4/1967 | Tam | 137/625.69 |
| 3,581,771 | 6/1971 | Garrison | 137/625.69 |
| 3,587,235 | 6/1971 | Goff | 91/436 |

Primary Examiner—Edward J. McCarthy
Attorney, Agent, or Firm—Zalkind & Shuster

[57] ABSTRACT

The invention provides a control valve having a valve piston and coacting valve sleeve for flow control in booster power steering systems of the kind having a servo steering pump and a metering pump, especially as used in motor vehicles having power steering cylinders. The valve piston and valve sleeve have novel rings and grooves that effect a throttling flow control as the valve piston is shifted in steering, which substantially reduces vibration or chatter of the valve, permits ready return to neutral of the valve piston and the danger of cavitation in the power cylinder precluded. The dimensioning of special rings on the piston coacting with rings in the valve sleeve produces the advantages of the invention particularly when the valve is controlling high pressures. The arrangement effects a throttling of pressure flow from the metering pump to the power cylinder such that, when the valve piston is shifted for steering, low throttling is at first effected followed by high throttling as the valve piston moves to its fully shifted position, corresponding to initial low pressure in a power cylinder reaching high pressure in the course of power piston travel, as pressure flow is metered from the manually operated metering pump to the control valve.

5 Claims, 3 Drawing Figures

CONTROL ELEMENT FOR AUXILIARY POWER STEERINGS

The prior art is exemplified in German Pat. No. 1,480,666 of June 19, 1969, showing a power steering control having several disadvantages in the use of an arrangement of control rings in movable valve pistons with outer surfaces chamfered, bevelled or stepped, for controlling flow through such surfaces from a pressure source to the pressure chambers of a double acting power cylinder. It has been found that there is a marked tendency for such arrangements of the prior art to produce chatter vibrations of the control piston which increase with the pressure of the booster fluid flow. Thus, the flow control leading edge in the valve past which edge the flow moves on its way to the power cylinder is necessarily gapped, i.e., fully opened as the valve is shifted for steering. Throttling of oil flow accordingly decreases at that gap, as does the damping effect on the valve during pressure increase in the power cylinder. Such gaps in the control surfaces for feeding pressure oil flow have always been large in the prior art when a valve is shifted to feed a power cylinder. As a result there is very little throttling and whereby vibrations causing chatter of the valve are experienced during the course of pressure build-up.

Such prior art arrangements also have the disadvantage in that automatic return by use of the usual torque rod to straight ahead travel position of a valve using the type of chamfers, bevels and rings heretofore known is impeded. This is due to the fact that the cross section of flow path between valve and coacting sleeve in neutral position is designed to effect relatively strong throttling for damping of vibrations when the valve is being shifted in steering. Thus, the torque rod must overcome the throttling effect in moving the valve from shifted back to neutral position.

A further disadvantage of the prior art arrangement is in impeding the operation of secondary suction valves in the neutral position of the valve piston. Such secondary suction valves are used to permit flow from the tank of the system to the chambers of the power cylinder in order to maintain them filled. Impeding such flow gives rise to a danger of cavitation in the power cylinder. The present invention precludes such danger by providing large cross sectional flow regions for such valve flow in neutral position and there is no throttling in neutral position.

The present invention overcomes the difficulties of the prior art by the use of rings on the valve piston and in the valve sleeve having edges through which pressure flow proceeds to the power cylinder in a throttled flow manner to effectively damp vibration of the valve piston against the vibrations that cause chatter. Furthermore, the novel arrangement inherently removes resistance to automatic return by the torque rod to neutral position of the piston valve and thus the steering spindle which operates it, because the throttling effect on oil movement decreases on reverse shifting of the valve piston to the point where throttling ceases when neutral position is reached.

Briefly, the valve piston disclosed herein is provided with rings that coact with rings in a valve sleeve in which it reciprocates wherein the dimensioning of the rings on the valve piston and the valve sleeve rings is such as to maintain a flow opening in the shifted position of the valve piston to effect throttling. The valve piston has two such rings for throttling control of respective cylinder chambers and each in integral with another respective exhaust control ring, spaced therefrom which are sealing rings for exhaust flow control for respective chambers. The two rings of each pair are spaced axially effecting grooves in the valve piston which are axially larger than respective coacting throttling rings extending radially inwardly from the valve sleeve. The throttling control rings of the valve piston and valve sleeve have radially spaced edges through which pressure flow must pass going to the power cylinder when the valve piston is shifted and thus a throttling is effected.

Preferably the throttling rings on the valve piston have a cylindrical shape in order to effect rapid throttling, but other shapes as hereinafter described may be used and various damping characteristics can be achieved.

A detailed description of the invention now follows, in conjunction with the appended drawing, in which.

Figure 1:
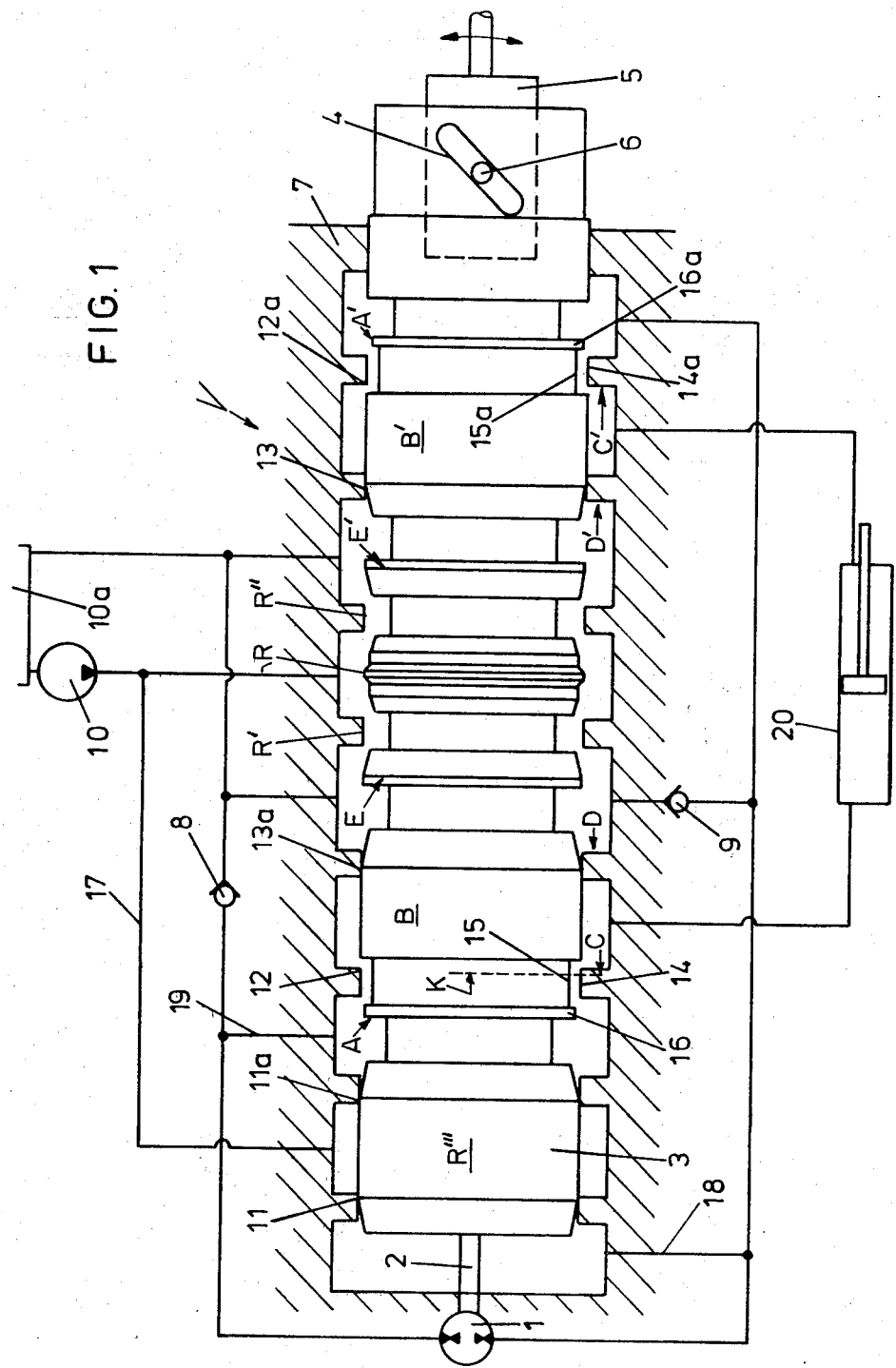
FIG. 1 is a longitudinal view with the valve sleeve in section, the valve piston being in neutral position and various components being symbolized.

Referring to FIG. 1, a reversible metering pump 1 is shown symbolically which may be carried in any suitable fashion on a steering housing (not shown) in which the steering control valve V is carried. A drive shaft 2 is connected to an end of valve piston 3 and serves to drive the metering pump. The other end of the valve piston has a cam slot 4. A steering spindle 5 is rotably carried in the valve piston 3 and has a radial pin 6 protruding into cam slot 4. The steering spindle 5 is also connected with the drive shaft 2 via a torque rod (not shown) which may pass through a central bore of the valve piston. Upon rotation of the steering spindle relative to the valve piston, and due to the torque resistance of the metering pump which holds the valve piston against rotation, pin 6 in cam slot 4 shifts the piston valve in one direction or the other from the centered or neutral position shown in FIG. 1, to control flow in a well known manner.

The torque rod, steering spindle, drive shaft and manual metering pump articulation is well known in the prior art and may be as shown in such U.S. Pat. Nos. 3,989,120; 3,597,128; 3,587,235; 3,443,378; showing various arrangements, structural details of which are not necessary to an understanding of the invention and are omitted.

The torque rod in the usual manner brings the valve piston 3 back to neutral position by the reaction of the cam slot 4 and pin 6 after a steering operation and maintains it in such neutral position, all as well known.

As seen in FIG. 1, secondary suction valves 8 and 9 are provided for the purpose of preventing cavitation by filling, from tank 10a, of the metering pump and the chambers of the double acting power cylinder 20. The suction valves may be carried or integrated into the valve sleeve 7 which may be a steering housing.

At the start of a steering movement by rotation of steering spindle 5, a torque rod receives customary torsional stress and twists relative to the valve piston 3 which, at the time is held against rotation by torque reaction of metering pump 1. Such reaction or inertia which must be overcome results in a shift of the valve piston 3 via a cam groove 4 and pin 6, axially right or left, depending on rotational direction of steering spindle 5 actuated by a steering wheel (not shown). Accordingly, a shift from the neutral position of valve piston 3 permits flow of pressure oil from an engine driven servo pump 10 which prior to that time merely bypassed its output to tank 10a as is obvious on FIG. 1. Upon valve piston shift, bypass is closed by a valve piston ring R against valve sleeve ring R' or R", depending on shift direction for left or right steering. Also, with closure of a valve piston ring E or E' with valve sleeve ring R' or R" pressure is built up in line 17, the output line of pump 10. Pressure flow is led to the valve piston at the groove 15 in the sleeve 7 between the cut-off edges 11 and 11a of valve piston ring R''' via a respective line 18 or 19, depending on shift direction, and thus to a respective side of metering pump 1, then serving as an intake.

The throttling effect of the invention is effected for one direction of valve piston shift by closing the gap between a piston valve throttling ring A and a valve sleeve throttling ring C. Ring A is spaced by a wide groove 15 from an exhaust sealing ring B of the valve piston, which groove is radially spaced and axially wider than ring C in neutral position. Similarly, counterpart rings A', B', C' and groove 15a are provided on the piston to achieve the throttling effect in opposite direction of shift, for a double acting power cylinder. The size of the grooves 15 and 15a ensure low throttling in a shift from neutral position. The diameters of rings A and A' are smaller than the diameters of coacting respective rings C and C'; rings B and B' have the piston diameter. Thus, it can be visualized that if the valve piston 3 is shifted, say, to the right, up to a position K (phantom time) from the neutral position, the effect of the relatively thin or narrow edge 16 of ring A in approaching surface 14 of ring C is to cause low throttling until the flow passage of large groove 15 is restricted when edge 16 is adjacent to and finally encompassed by ring C. At this time flow past edge 12 of ring C is fully throttled to an extent permitted by the aforementioned difference in diameters between rings A and C, ring A being of smaller diameter.

The restricting passage at this time is in the flow path from metering pump 1 and the left hand chamber of power cylinder 20, the other chamber exhausting via the shifted position of an exhaust control ring B' on the valve piston to tank 10a, via an opening between the surface 13 on a valve sleeve ring D'. The double acting power cylinder piston moves to the right, the left hand chamber exhausts.

Alternatively, if the valve piston 3 is shifted to the left, then the restricted flow past edge 12a effects the full throttling effect of flow to the right hand chamber of the power cylinder via the throttling rings A', C' and exhaust control ring B effects an opening with the surface 13a and a coacting valve sleeve ring D. Surfaces 14a and edge 16a of respective throttling rings A' and C' are then operational for pressurizing the right hand chamber and exhausting the left hand chamber occurs via the aforesaid opening.

The amount of opening between rings A and C, or A' and C', to effect the desired throttling is, of course, a matter of design based on engineering calculations for various parameters such as flow rate, pressure, power cylinder capacity and such other factors with which persons skilled in the art would be aware.

As will be evident from FIG. 1, rings A and B form a pair spaced by enlarged groove 15, while rings A' and B' are separated by enlarged groove 15a, carried in reverse order as a mirror image on the valve piston as are rings C, D and C', D'. The valve piston 3 is thus completely symmetrical, the sets of rings and grooves being duplicated for double acting power cylinders except for ring R''' which controls direction of flow to the manually operable metering pump 1 from the engine driven pump 10 dependent on chosen steering direction by rotation of steering spindle 5.

The particularly novel feature of the invention are the throttling control openings afforded by surfaces 16 and 16a to effect throttling edges 12 and 12a.

The grooves 15 and 15a, respectively between the ring pairs A-B and A'-B' are axially wider than respective rings C-C' to ensure low throttling in neutral position and also to provide sufficient clearance of movement for throttling rings A and A' from low to high throttling operation, via the radial spacing.

The rings A and A' are preferably cylindrical while slightly smaller in diameter than their integral respective rings B and B' but may be of the same diameter and provided with tangential flats to permit throttling of flow. Also, the rings A and A' may be conical at their peripheries or more than one throttling ring in place of a single ring A or A' may be used, of stepped diameters.

Figure 2:
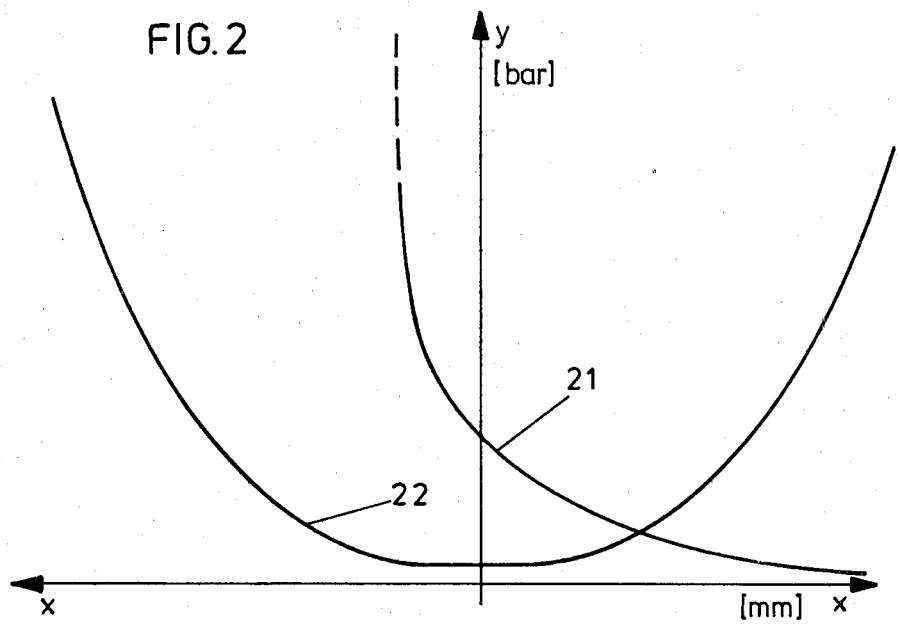
FIG. 2 is a graph showing the characteristic curves effected by a prior art arrangement as to throttling and pressure regulation.

To illustrate the effective advantage over the prior art reference is made to FIG. 2, a graph wherein pressure is plotted on the Y-axis. The extent of movement of the valve piston is plotted on the positive X-axis for movement to the right and on the negative X-axis for movement to the left. The units for the Y axis is in atmospheres and for the X-axis in milimeters for travel.

In prior art arrangements, e.g. German Pat. No. 1480666, at edge 12, upon shifting of valve piston 3 to the left, the throttling effect on oil flow decreases with increased movement or shifting of the valve piston.

This is indicated in FIG. 2, by the throttling characteristic line 21 for the edge 12. Thus, the damping in the zone of neutral position is high but becomes low in the course of shifting of the valve piston 3. This characteristic curve 21 leads to the initially described disadvantages of producing vibration and chatter. Likewise, on FIG. 2, the pressure regulation of the pump of the prior art arrangement is shown in the curve 22.

Figure 3:
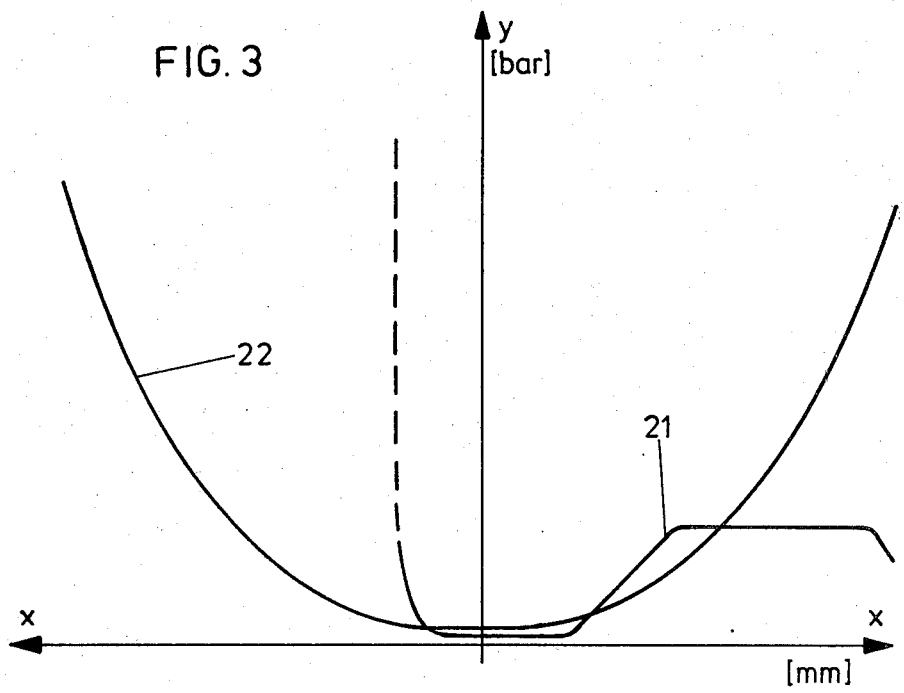
FIG. 3 is a graph for purposes of comparison showing the throttling characteristics and pressure regulation effected by the invention.

In the construction of the invention the effect is the opposite; edges 12 and 12a are wide open in neutral position. There is no throttling at this time since pump flow is bypassed to the tank. However, upon shifting the valve piston very little throttling takes place initially until buildup of pressure in the power cylinder as the gap at 12 or 12a starts closing. Finally, maximum throttling and vibration damping effect is achieved when ring A or A' is encompassed by ring C or C', respectively. Accordingly, the advantage in making the axial width of recesses 15 or 15a greater than that of respective surfaces 14 or 14a of rings C and C' becomes evident since this permits flow with a gradual linear increase of throttling characteristic followed by uniform throttling as seen in FIG. 3, curve 21. In neutral position of piston valve 3, oil flow past rings 12 and 12a is initially not throttled during a period of little pressure buildup when chatter is not significant but after a certain point in pressure buildup throttling is increased to a uniform maximum as the power cylinder travels. This also permits ready automatic return of the steering spindle via the stressed torque rod to straight ahead travel position without being impeded upon reversal of power cylinder piston since throttling is then reduced to offer decreasing resistance. At the same time, the secondary suction valves 8 and 9 are effective since flow therethrough is not throttled, precluding cavitation occurring in the power cylinder 20 and metering pump 1.

Accordingly, vibration damping by throttling of the oil stream can be made effective when the valve piston is in a position in which any objectionable vibrations may occur and this can, of course, vary from system to system. However, the arrangement makes it possible to match the degree of throttling and damping to any given system avoiding the drawbacks of the prior art.

What is claimed is:

1. In a control valve for a power steering system, said control valve being of the kind having a valve sleeve (7) and a valve piston (3) shiftable therein by rotation of a steering spindle (5) and including flow control rings and grooves of said valve piston coacting with flow control rings grooves and flow passages of said valve sleeve to control pressure flow from a metering pump (1) actuated by said steering spindle to a power cyilinder (20) and exhaust therefrom:

the improvement which comprises:

at least one throttling ring (A) on said valve piston and at least one throttling ring (C) on said valve sleeve effecting a throttling flow passage therebetween for pressure flow to a power cylinder wherein said pressure flow has initial low throttling in the shifting of said valve piston starting from a netural position with initial low pressure in said power cylinder to high throttling upon pressure increasing in said cylinder as said valve piston is shifted; said valve piston having a groove (15) adjacent the throttling ring (A) thereof radially spaced from and axially wider than the throttling ring (C) of said valve sleeve to effect low throttling in initial steering control shifting of said valve piston from said neutral piston; said throttling rings being mutually dimensioned to effect maximum throttling during high pressure flow when the throttling ring (A) of said valve piston is adjacent the throttling ring (C) of said valve sleeve.

2. In a control valve as set forth in claim 1, wherein the throttling ring (A) on said valve piston is axially thinner than the throttling ring (C) of said valve sleeve.

3. In a control valve as set forth in claim 1, wherein the throttling ring (A) on said valve piston has a cylindrical edge.

4. In a control valve as set forth in claim 1, wherein the throttling ring (A) on said valve piston has a chamfered edge.

5. In a control valve as set forth in claim 1 or 2, or 3, or 4, including an exhaust control sealing ring (B) on said valve piston spaced from the throttling ring (A) thereof by said groove (15); said valve sleeve having a coacting ring (D) coacting with said sealing ring (B) to control exhaust flow from an end of a double acting power cylinder during a steering operation shift of said valve piston in one direction while the opposite end is being pressurized through said throttling rings (A,C); said rings (A,B,C,D) and groove (15) being duplicated (A'; B'; C'; D'; 15a) on said valve piston for throttled pressurizing and exhausting of said power cylinder when motivated in reverse direction by shift of said valve piston in a reverse direction.

* * * * *